US012711932B2

(12) United States Patent

Akai et al.

(10) Patent No.: US 12,711,932 B2

(45) Date of Patent: Aug. 18, 2026

(54) ELECTRONIC KEYBOARD INSTRUMENT

(71) Applicant: CASIO COMPUTER CO., LTD., Tokyo (JP)

(72) Inventors: Hiroki Akai, Tokyo (JP); Naoto Imamura, Tokyo (JP); Yuuki Nakajima, Tokyo (JP); Shingo Fukushima, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 334 days.

(21) Appl. No.: 18/607,868

(22) Filed: Mar. 18, 2024

(65) Prior Publication Data

US 2024/0321247 A1 Sep. 26, 2024

(30) Foreign Application Priority Data

Mar. 24, 2023 (JP) ................................ 2023-047948

(51) Int. Cl.
*G10C 3/02* (2006.01)
*G10C 3/06* (2006.01)
(Continued)

(52) U.S. Cl.
CPC ................ *G10H 1/32* (2013.01); *G10C 3/02* (2013.01); *G10C 3/06* (2013.01); *G10C 3/12* (2013.01)

(58) Field of Classification Search
CPC . G10H 1/32; G10H 1/346; G10H 1/34; G10C 3/02; G10C 3/06; G10C 3/12; H04R 5/02; H04R 1/025; H04R 1/347
See application file for complete search history.

(56) References Cited

U.S. PATENT DOCUMENTS

2008/0072747 A1 3/2008 Nishida
2010/0288110 A1 11/2010 Hoshino
(Continued)

FOREIGN PATENT DOCUMENTS

EP 2894630 A1 7/2015
JP H01-321479 A 12/1989
(Continued)

OTHER PUBLICATIONS

EPO; Application No. EP24164840.1; Extended European Search Report issued Aug. 28, 2024.

*Primary Examiner* — Kimberly R Lockett

(74) *Attorney, Agent, or Firm* — Fitch, Even, Tabin & Flannery LLP

(57) ABSTRACT

An electronic keyboard instrument includes a main body case configured to include a sound emitting hole in a lower side, a keyboard provided inside the main body case, a sound emitting unit disposed on the lower side of the main body case in such a manner that a sound emitting port corresponding to the sound emitting hole is directed towards the keyboard, and a plate-shaped unit provided on an upper side of the sound emitting unit and configured to include a cutout formed in a portion corresponding to the sound emitting hole, and a communication path is provided inside the main body case, the communication path being configured to enable a sound emitted by the sound emitting unit to be emitted from an upper side of the keyboard towards an outside by way of the cutout in the plate-shaped unit.

15 Claims, 9 Drawing Sheets

(51) Int. Cl.

| | |
|---|---|
| ***G10C 3/12*** | (2006.01) |
| ***G10H 1/32*** | (2006.01) |

(56) References Cited

U.S. PATENT DOCUMENTS

| | | | | |
|---|---|---|---|---|
| 2018/0182363 | A1 | 6/2018 | Hoshino | |
| 2024/0430615 | A1 * | 12/2024 | Akai | H04R 1/26 |

FOREIGN PATENT DOCUMENTS

| | | | |
|---|---|---|---|
| JP | 03-117287 | U | 12/1991 |
| JP | 2003-084768 | A | 3/2003 |
| JP | 2020-064147 | A | 4/2020 |

* cited by examiner

ELECTRONIC KEYBOARD INSTRUMENT

CROSS-REFERENCE TO RELATED APPLICATION

This application is based upon and claims the benefit of priority under 35 USC 119 of Japanese Patent Application No. 2023-047948 filed on Mar. 24, 2023, the entire disclosure of which, including the specification, claims, drawings and abstract, is incorporated herein by reference in its entirety.

BACKGROUND

Technical Field

The present disclosure relates to electronic keyboard instrument.

Description of the Related Art

There have conventionally been known electronic keyboard instruments which can provide a key press-down feeling closer to a key press-down feeling provided by a real piano by including a mass element such as a hammer. For example, Japanese Unexamined Patent Application Publication No. 1-321479 as a patent literature discloses an electronic keyboard instrument which includes a main body case, a keyboard disposed on a front side of the main body case, a loudspeaker unit disposed on a back side of the keyboard, and a tone escape opening which is opened in an upper portion of the keyboard. In this electronic keyboard instrument, the tone escape opening I s opened towards the front side of the main body case. As a result, vibrations of a vibrator plate of the loudspeaker unit are transmitted to a player as play sound via the tone escape opening.

SUMMARY

According to an aspect of the present disclosure, there is provided electronic keyboard instrument including a main body case configured to include a sound emitting hole in a lower side, a keyboard provided inside the main body case, a sound emitting unit disposed on the lower side of the main body case in such a manner that a sound emitting port corresponding to the sound emitting hole is directed towards the keyboard, and a plate-shaped unit provided on an upper side of the sound emitting unit and configured to include a cutout formed in a portion corresponding to the sound emitting hole, wherein a communication path is provided inside the main body case, the communication path being configured to enable a sound emitted by the sound emitting unit to be emitted from an upper side of the keyboard towards an outside by way of the cutout in the plate-shaped unit.

DESCRIPTION OF THE EMBODIMENT

Figure 1:
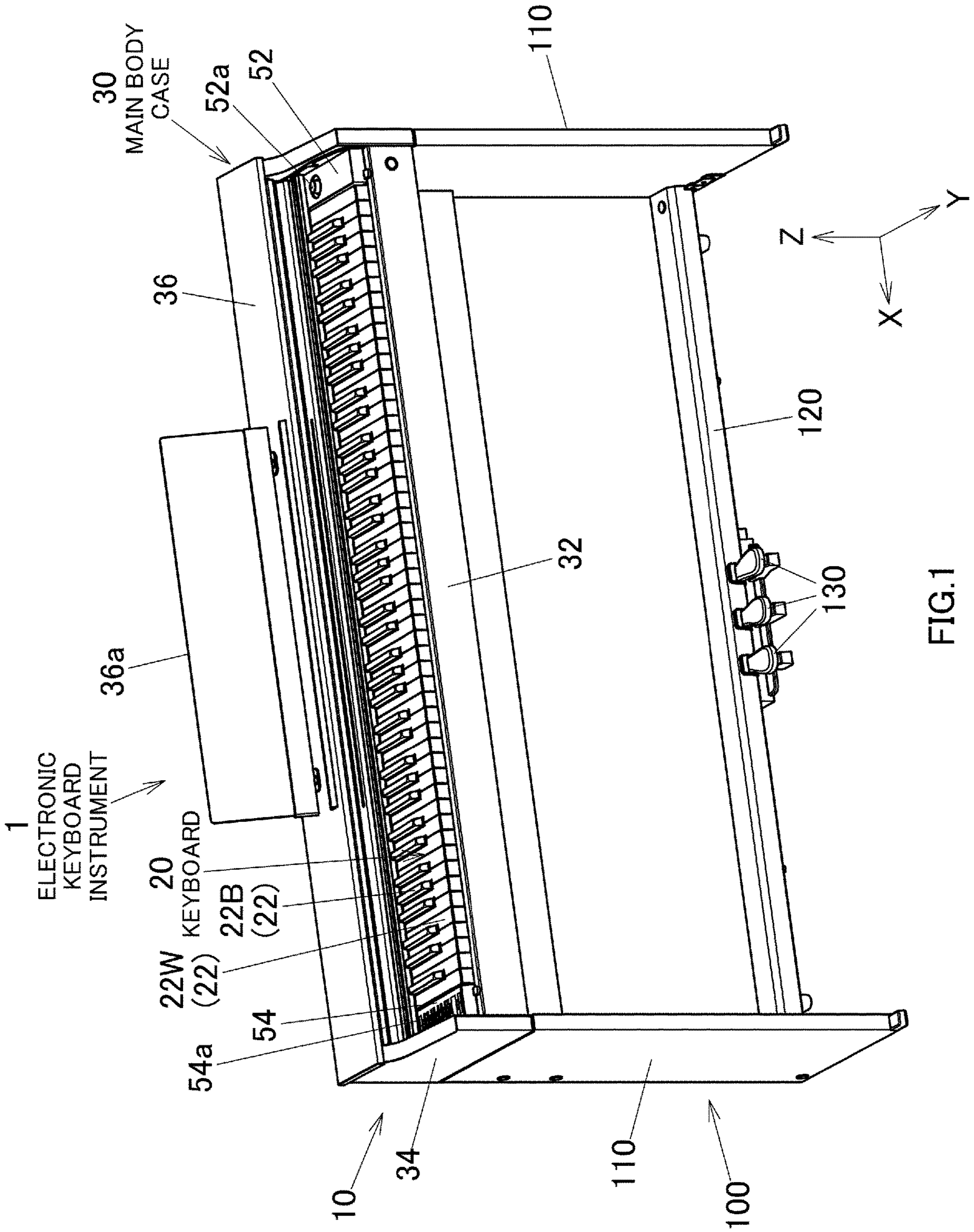
FIG. 1 is an overall perspective view of an electronic keyboard instrument according to an embodiment of the present disclosure as viewed from a front side.
Figure 2:
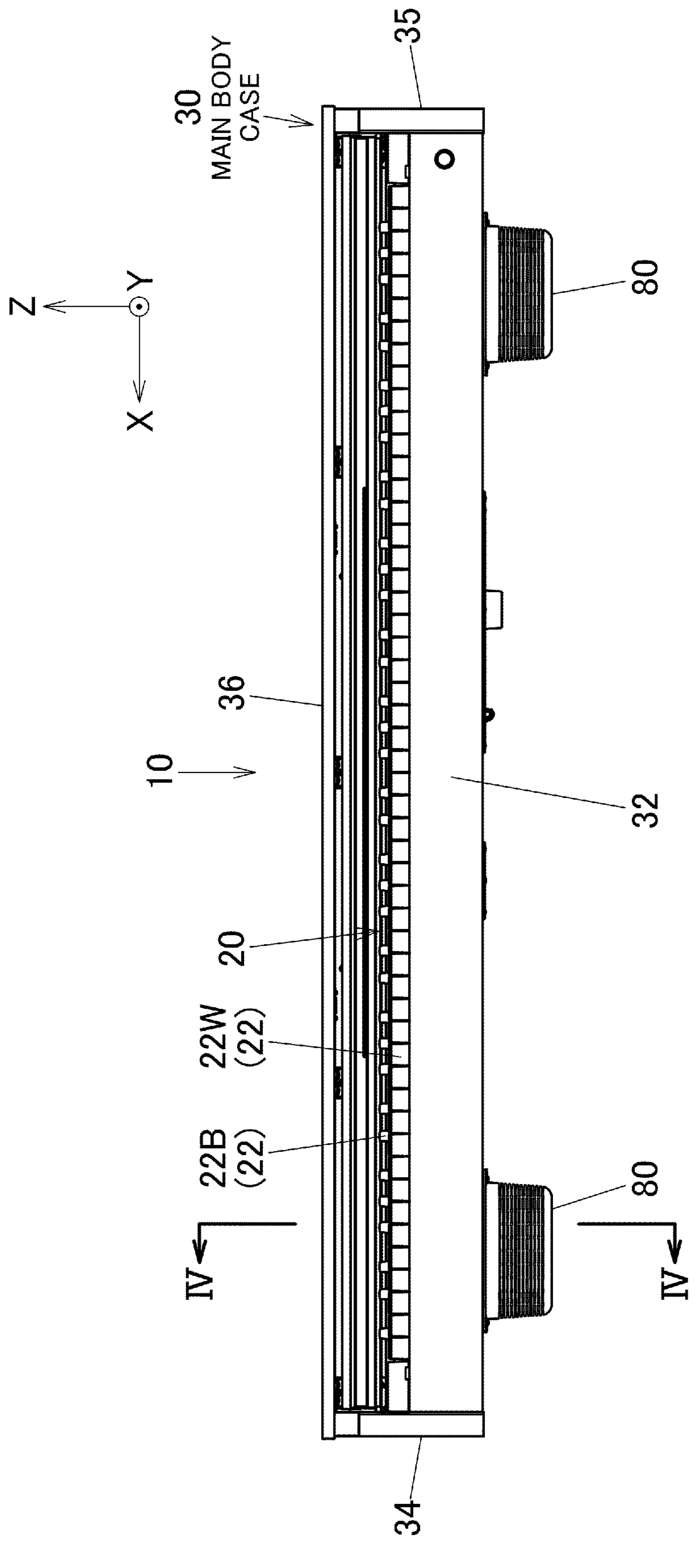
FIG. 2 is a front view of a main body case of the electronic keyboard instrument according to the embodiment.

Referring to drawings, an embodiment of the present disclosure will be described. An electronic keyboard instrument 1 shown in FIG. 1 includes a main body part 10 and a leg part 100. As shown in FIGS. 1 and 2, the main body part 10 includes a keyboard 20, which has multiple keys 22 such as white keys 22W and black keys 22B, and a main body case (a casing) 30, which surrounds the keyboard 20 to hold the keyboard 20. The leg part 100 includes a pair of side plate units 110, a pedal frame 120, and a pedal device 130. In the following description, an alignment direction (an X-axis direction) of the multiple keys 22 of the keyboard 20 is referred to as a left-right direction (an X-axis positive direction is referred to a leftward direction), an extending direction (a Y-axis direction, also referred to as a longitudinal direction of the key) of each key 22 is referred to as a front-back direction (a Y-axis positive direction is referred to as a forward direction), and an upper-lower direction (a Z-axis direction) of the electronic keyboard instrument 1 is referred to as an upper-lower direction (a Z-axis positive direction is referred to as an upward direction).

As shown in FIG. 1, the pair of side plate units 110 are each a plate unit which is erected on a setting surface on both left- and right-hand sides of the electronic keyboard instrument 1 in such a posture that both plate surfaces of the plate unit 110 are oriented in the left-right direction so as to support the main body case 30. The pedal frame 120 spans between the pair of side plate units 110 so as to connect them together at lower sides of the pair of side plate units 110. The pedal device 130 is provided substantially at a central portion of the pedal frame 120 in the left-right direction. Hereinafter, a configuration of the main body port 10 will be described in detail.

As shown in FIGS. 1 to 4, when viewed from above, the main body case 30 has substantially a rectangular shape which is elongated laterally in such a manner that a longitudinal direction thereof follows the left-right direction and has thick plates such as a front surface plate 32, a back surface plate 33, a left side surface plate 34, a right side surface plate 35, an upper surface plate 36, and a lower surface plate 37. In addition, the main case body 30 has substantially an L-shaped vertical section (refer to FIG. 4). The front surface plate 32 has substantially a rectangular shape which is elongated in the left-right direction and is provided at a front lower portion of the main body part 10, constituting a front surface of the main body case 30. The back surface plate 33 has substantially a rectangular shape which is elongated in the left-right direction and is provided on a back side of the main body part 10, constituting a back surface of the main body case 30.

The left side surface plate 34 and the right side surface plate 35 have substantially a rectangular shape which is elongated in the front-back direction and are provided individually on a left-hand side and a right-hand side of the main body part 10, constituting a left side surface and a right side surface of the main body case 30, respectively. The upper surface plate 36 has substantially a rectangular shape which is elongated in the left-right direction and is provided at an upper backward portion of the main body part 10, constituting an upper surface of the main body case 30. As shown in FIG. 1, a music stand 36*a* is attached substantially to a central portion of the upper surface plate 36 in the left-right direction. Here, in descriptions which will be made by reference to FIG. 2 onwards, the music stand 36 is omitted from illustration. The lower surface plate 37 has substantially a rectangular shape which is elongated in the left-right direction and is provided on a lower side of the main body part 10, constituting a lower surface of the main body case 30.

Figure 4:
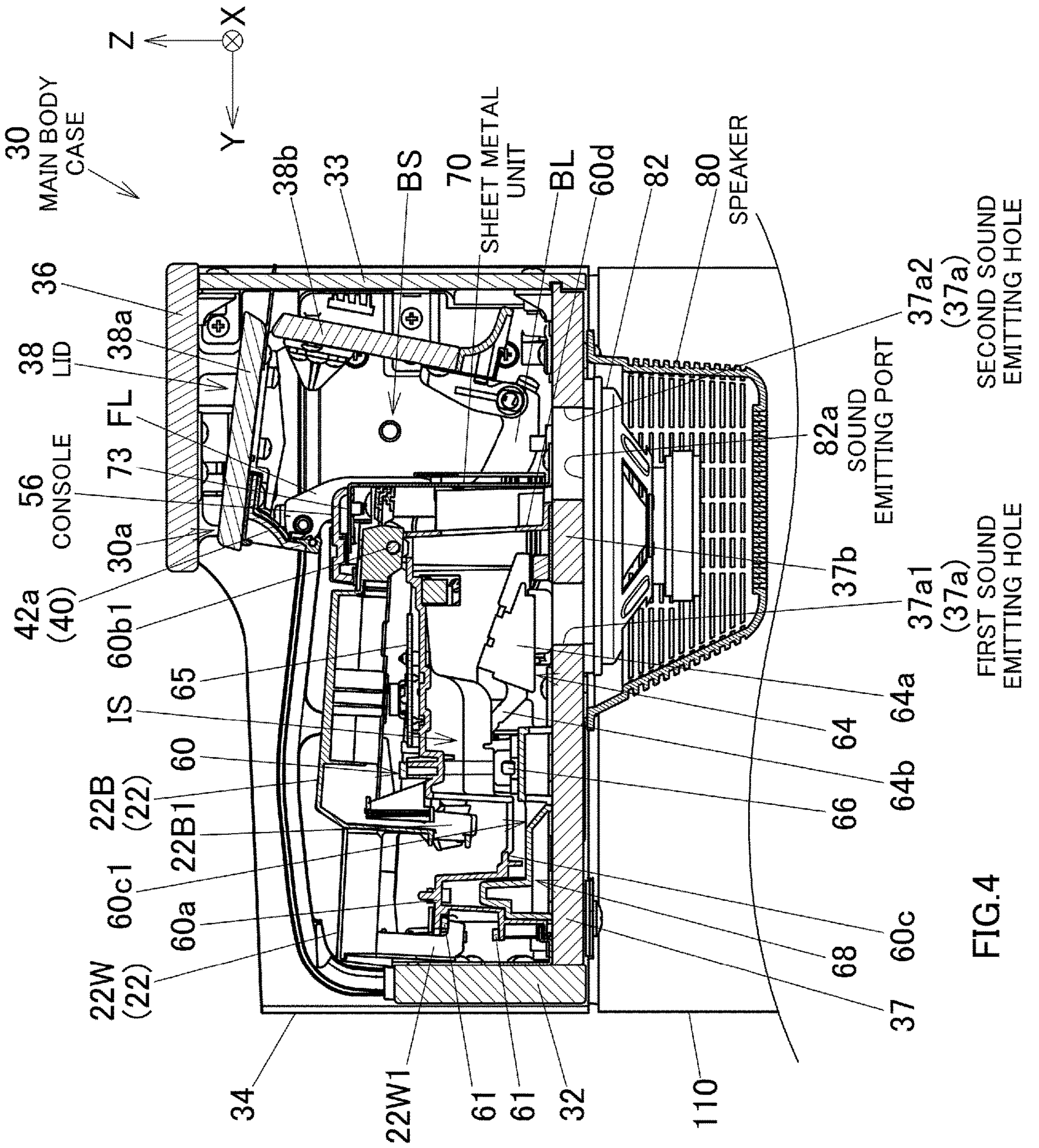
FIG. 4 is a sectional view of the main body case of the electronic keyboard instrument according to the embodiment, which is a sectional view taken along a line IV-IV in FIG. 2.
Figure 5:
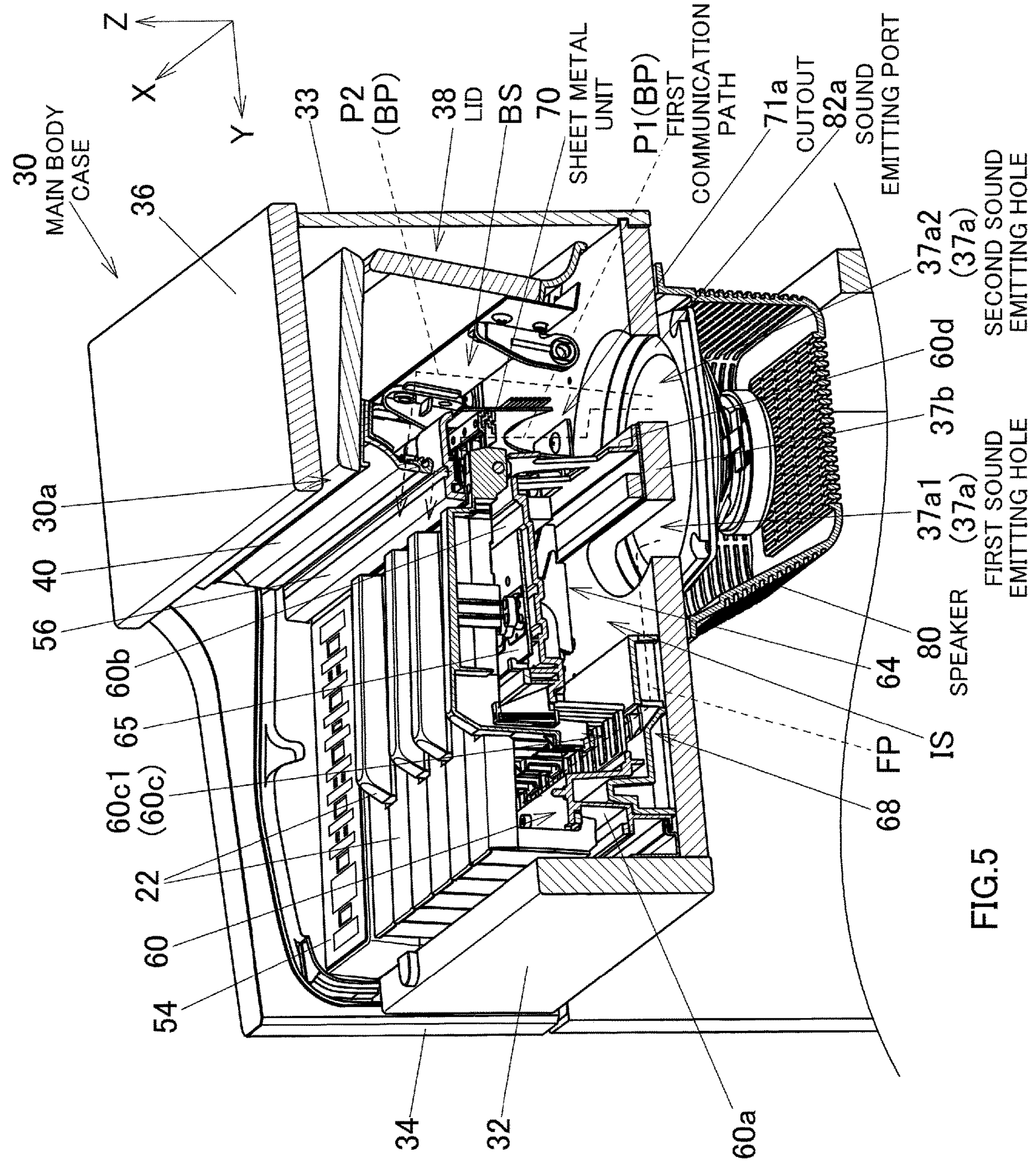
FIG. 5 is a perspective sectional view of the main body case of the electronic keyboard instrument according to the embodiment, which is a perspective sectional view of a section corresponding to FIG. 4.

As shown in FIGS. 4 and 5, a substantially circular sound emitting hole 37*a*, which is opened in the upper-lower direction, is provided in a slightly backward portion of the lower surface plate 37 at each of left and right end portions thereof. Each sound emitting hole 37*a* is divided in the front-back direction substantially into a semi-circular shape by a part (hereinafter, referred to as a "dividing portion 37*b*") of the lower surface plate 37, and an opening on the front side is referred to as a first sound emitting hole 37*a*1, while an opening on the back side is referred to a second sound emitting hole 37*a*2. The first sound emitting hole 37*a*1 is made slightly smaller in the size of the opening than the second sound emitting hole 37*a*2.

Figure 3:
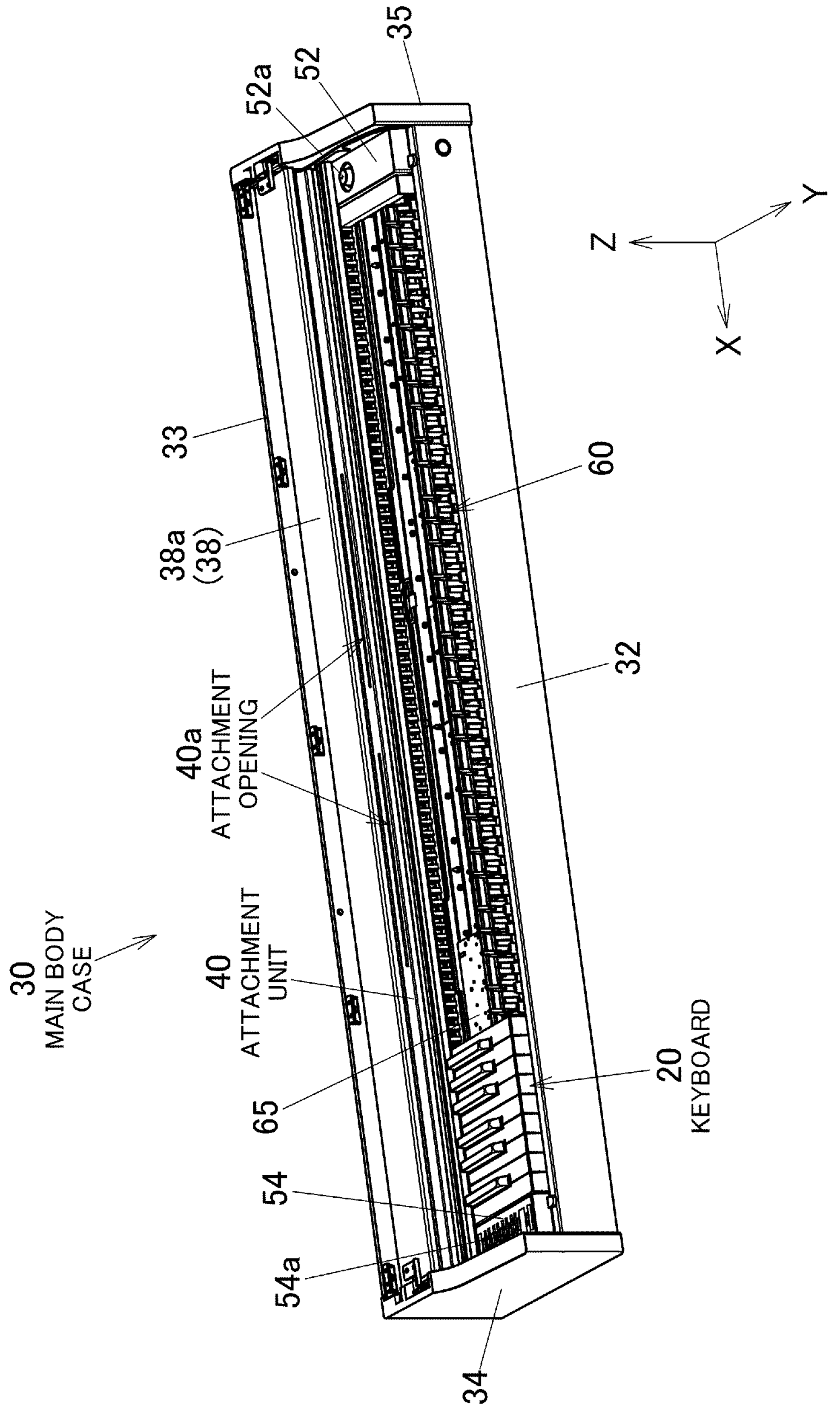
FIG. 3 is a perspective view of the main body case of the electronic keyboard instrument according to the embodiment with a part of a keyboard removed.

As shown in FIGS. 3 and 4, the main body case 30 has an opening in a front upper side thereof, and upper surfaces, which constitute key press-down surfaces, and portions of front surfaces of the keys 22 of the keyboard 20 are exposed outwards from the opening so formed. The main body part 10 includes a lid (a keyboard lid) 38 for covering a portion of the keyboard 20 which is exposed outwards. The lid 38 is a thick plate and is made up of a front lid plate 38*a* and a back lid plate 38*b* which are each a plate-shaped unit having substantially a rectangular shape which is elongated in the left-right direction. The front lid plate 38*a* is connected rotatably with a front lid link unit FL, which is fixed to the main body case 30, via an attachment unit 40, which is elongated laterally. Two attachment openings (second communication holes) 40*a*, which are opened in such a manner as to penetrate the attachment unit 40, are provided individually in leftward and rightward portions (handle portions) of the attachment unit 40 which lie closer to a center of the attachment unit 40. Each attachment opening 40*a* is provided in such a manner as to be elongated in the left-right direction.

The back lid plate 38*b* is connected rotatably with a back lid link unit BL, which is fixed to the main body case 30. The front lid plate 38*a* and the back lid plate 38*b* are coupled together in such a manner as to be folded into two portions, so as to be accommodated in an interior of the main body part 10 while being freely pushed into and pulled out of the interior of the main body part 10 from an opening provided between the keyboard 20 and the upper surface plate 36 (hereinafter, referred to as an "upper opening portion 30*a*" (refer to FIG. 4)). In the electronic keyboard instrument 1, when a power supply is switched off, the lid 38 is pulled out of the interior of the main body part 10 to cover the opening of the main body case 30, whereby the exposed portion of the keyboard 20 is covered.

In the electronic keyboard instrument 1, the main body case 30 of the main body part 10 and the side plate units 110 of the leg part 100, which are both exposed outwards, are made of wood, so as to impart a feeling of good quality to the electronic instrument 1. As shown in FIG. 1, a power supply panel unit 52 where a power supply button 52*a* and the like are disposed is provided between the keyboard 20 and the right side surface plate 35. In addition, a setting panel unit 54 where a volume control button 54*a* and the like are disposed is provided between the keyboard 20 and the left side surface plate 34.

Figure 6:
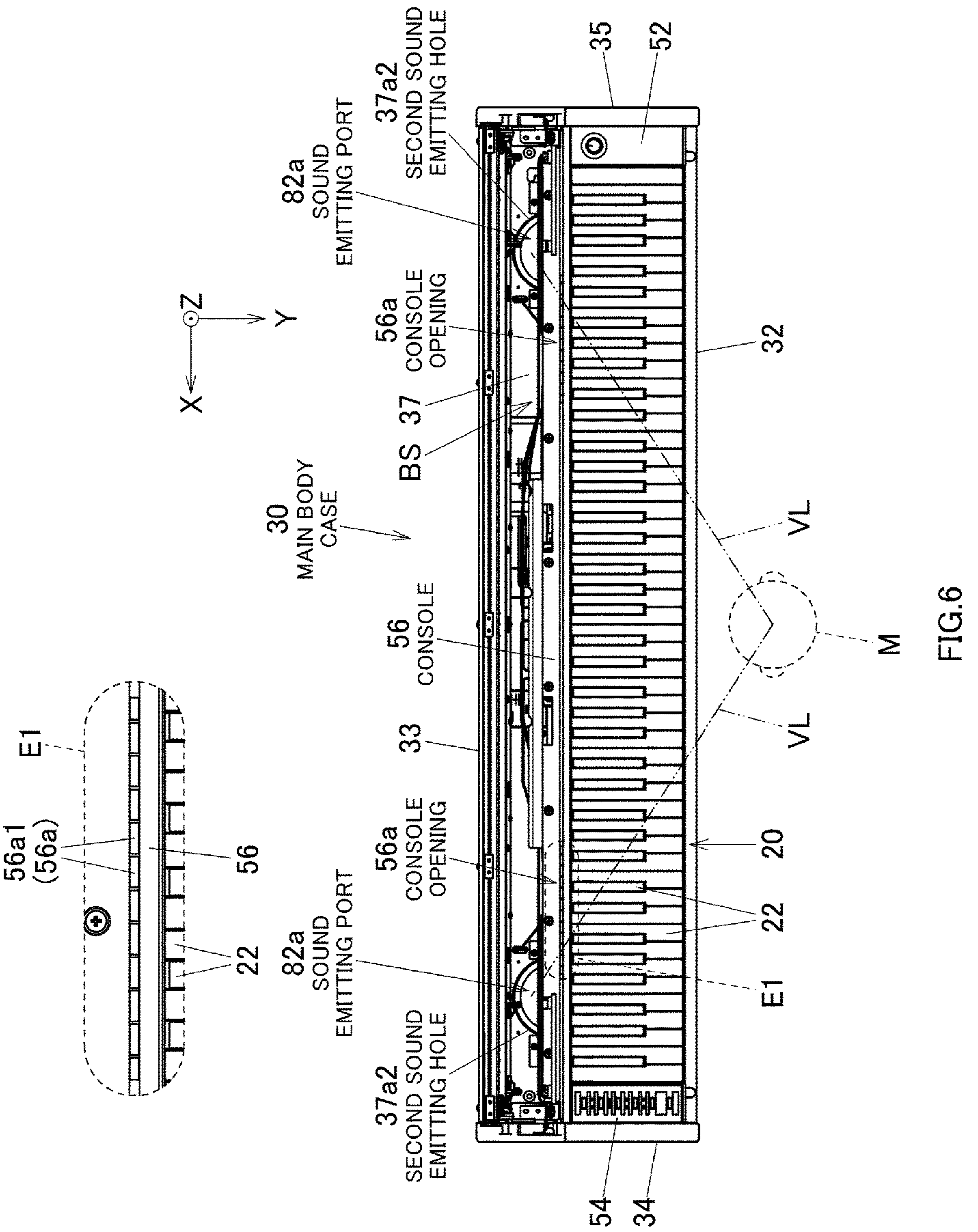
FIG. 6 shows a top view (a plan view) of the main body case of the electronic keyboard instrument according to the embodiment, that is, a top view of the main body case with a lid removed, in which E1 is an enlarged top view of a left console opening portion.

As shown in FIGS. 3 to 5, a console (a covering unit) 56, which has substantially a rectangular shape elongated in the left-right direction, is provided on back sides of the keys 22 of the keyboard 20. The console 56 is provided in such a manner as to cover back end portions of the keys 22 of the keyboard 20, whereby the console 56 makes it difficult for an interior of the main body case 30 to be seen from the outside of the keyboard d instrument 1 (a blindfolding function). As shown in FIG. 6, two console openings (first communication holes) 56*a*, which are opened in the upper-lower direction, are provided individually in leftward and rightward portions of the console 56 which lie closer to a center of the console 56 in such a manner as to be aligned in the left-right direction. Each console opening 56*a* is provided substantially into elongated a laterally rectangular shape. Here, the two console openings (the first through holes) 56*a* may be opened in the front-back direction while being aligned in the left-right direction.

As shown in FIGS. 3 to 5, an inner case 60 is provided in the interior of the main body case 30. The inner case 60 is provided in such a manner as to extend substantially over a whole area of a lower side of the keyboard 20, and similar to the keyboard 20, the inner case 60 has a laterally elongated shape. The inner case 60 is configured as a hollow unit which is opened downwards. The keyboard 20 is supported on the main body case 30 by the inner case 60 and a support unit 68, which will be described later. A sheet metal unit 70 substantially having a plate shape is provided on a back side of the inner case 60 in such a posture that both plate surfaces thereof are oriented in the front-back direction. The sheet metal unit 70 is designed as a unit for fixing the keyboard 20 to the main body case 30 and is disposed between the first sound emitting hole 37*a*1 and the second sound emitting hole 37*a*2 on a side of the second sound emitting hole 37*a*2. A configuration of the sheet metal unit 70 will be described in detail later.

A back space (a space) BS is defined between the sheet metal unit 70 and the back surface plate 33. The lid 38 described above is configured to be accommodated in the back space BS. With the lid 38 accommodated in the back space BS, the back space BS constitutes a space surrounded by the lid 38, the attachment unit 40, and the sheet metal unit 70. On the other hand, an inner space IS is defined inside the inner case 60 in a position lying between the inner case 60 and the lower surface plate 37. The sheet metal unit 70 is provided slightly backwards of an upper portion of the dividing portion 37*b* of the lower surface plate 37. As a result, in the sound emitting hole 37*a*, the first sound emitting hole 37*a*1 communicates with the inner space IS, while the second sound emitting hole 37*a*2 communicates with the back space BS.

A front end portion of the inner case 60 is formed into a convex portion 60*a* which protrudes upwards into a convex shape. A portion of the inner case 60 which is situated below lower sides of the black keys 22B of the keys 22 is formed into a table portion 60*b* which protrudes upwards into a table shape. A portion lying between the convex portion 60*a* and the table portion 60*b* is formed into a concave portion 60*c* which is recessed downwards into a recess. A rotational fulcrum 60*b*1, which is configured to support rotatably a back end portion of each key 22 of the keyboard 20, is provided at a back side portion of an upper surface of the table portion 60*b*. In addition, a control circuit board 65 is provided on the upper surface of the table portion 60*b*. A switch is provided on the control circuit board 65 so as to sound a note corresponding to the key 22 which is pressed down. Multiple case openings 60*cl*, which are opened in the upper-lower direction, are provided in the concave portion 60*c* in such a manner as to be aligned in the left-right direction (refer to FIG. 5).

A hook-shaped white key restricting portion 22W1 is provided on each of the white keys 22W of the keys 22 in such a manner as to extend downwards from a front end portion of the white key 22W, so that an upper limit position and a lower limit position of the white key 22W are restricted by this white key restricting portion 22W1 as a result of the white key restricting portion 22W1 coming into interference with first cushions 61 which are provided at an uppermost portion and a lowermost portion of the convex portion 60*a* on a front side thereof, respectively. In addition, a black key restricting portion 22B1 is provided on each of the black keys 22B of the keys 22 in such a manner as to extend downwards from a front end portion of the black key 22B, so that an upper limit position and a lower limit position of the black key 22B are restricted by this black key restricting portion 22B1 as a result of the black key restricting portion 22B1 coming into interference with second cushions 62 which are provided at an uppermost portion and a lowermost portion of the table portion 60*b* on a front side thereof, respectively.

Multiple hammers 64 are provided individually inside the table portions 60*b* within the inner space IS in such a manner as to connect with the corresponding keys 22. The hammer 64 includes a weight 64*a* having substantially a triangular shape and an arm 64*b* extending forwards from the weight 64*a* into a straight line. The arm 64*b* is rotatably supported on a pivot 66 provided at an inner frontal portion of the table portion 60*b*. Here, when the key 22 is pressed down, the weight 64*a* of the hammer 64 rises so as to impart heaviness to the key 22 when the key 22 is pressed down. As a result, a key press-down feeling can be obtained which is close to a key press-down feeling provided by a real piano.

A support unit 68 is provided at a frontal portion in the inner space IS in such a manner as to be disposed on the lower surface plate 37. The support unit 68 has a hollow interior and is screwed down onto the lower surface plate 37 to thereby be attached to the main body case 30. The keyboard 20 is indirectly supported on the main body case 30, which is made of wood, via the inner case 60 by the support unit 68. The pivot 66 for supporting the arm 64*b* of the hammer 64 is provided on the support unit 68.

As shown in FIGS. 2 and 4, the electronic keyboard instrument 1 has two loudspeakers (sound emitting units) 80 which are disposed at both leftward and rightward end portions in the left-right direction on a lower side of the main body case 30. Each loudspeaker 80 is screwed down to a lower side of the lower surface plate 37 for attachment, with a side of a cone 82 where a sound emitting port 82*a* is provided oriented upwards (towards the keyboard 20), in such a manner as to correspond in position to the corresponding sound emitting hole 37*a* provided in the lower surface plate 37. In addition, each loudspeaker 80 is provided in a position that does not overlap in the upper-lower direction with a portion of a key gap defined between the keys 22 which is situated at a distal portion of the key 22. The size and shape of the cone 82 substantially coincides with the size and shape of the corresponding sound emitting hole 37*a*, and a sound emitted from each loudspeaker 80 is configured to pass through the first sound emitting hole 37*a*1 to be transmitted to the inner space IS while passing through the second sound emitting hole 37*a*2 to be transmitted to the back space BS.

Among sounds emitted from each loudspeaker 80, the sound that is transmitted to the back space BS passes through the back space BS where the lid 38 is accommodated, escapes to the upper side of the keyboard 20 and is then emitted towards the player M (refer to FIG. 6). That is, there is provided in the back space BS a back communication path (a communication path) BP (refer to FIG. 5) through which a sound emitted from each loudspeaker 80 is propagated in such a manner as to pass through the second sound emitting hole 37*a*2 to reach the upper side of the keyboard 20. The back communication path BP is positioned in a location that does not overlap with the keyboard 20 in the upper-lower direction.

On the other hand, as has been described above, the various constituent components such as the keyboard 20, the inner case 60, the control circuit board 65, the hammers 64, and the support unit 68 are provided in the inner space IS. Among the sounds emitted from each loudspeaker 80, the sound that is transmitted to the inner space IS is projected towards the player M side through the gaps between each key 22, after passing between the support unit 68 and the inner case 60. That is, in the inner space IS, there is a front communication path FP (refer to FIG. 5) that allows sound from each loudspeaker 80 to pass through the first sound emitting hole 37*a*1, travel through the space inside the support unit 68, and reach the gaps between each key 22.

Next, the back communication path BP, which is provided in the back space BS, will be described in detail. As shown in FIG. 5, in the present embodiment, the back communication path BP includes a first communication path P1 which extends from the second sound emitting hole 37*a*2 to a front side of the sheet metal unit 70, passes between the sheet metal unit 70 and a back end wall 60*d* of the inner case 60, and eventually reaches the console openings 56*a* and a second communication path P2 that goes from the second sound emitting hole 37*a*2, through the back space BS on the back side of the sheet metal unit 70, and eventually reaches the attachment unit 40.

Here, a configuration and a layout mode of each console opening 56*a* will be described in detail. As shown in FIG. 6, the console 56 is configured such that only the console openings 56*a* are opened therein and no other openings are opened in other portions of the console 56. In addition, as shown in an enlarged view of a portion denoted as E1 in FIG. 6, each console opening 56*a* is made up of multiple small holes 56*a*1, each having a laterally elongated rectangular shape, which are provided continuously in the left-right direction. An interior and an exterior of the console 56 are made to communicate with each other by the console openings 56*a*. Each console opening 56*a* is provided only on a virtual line VL connecting the sound emitting port 82*a* with a player, and its vicinity, when the main body case 30 is viewed above in a plane with the player M placed substantially at a central portion of the keyboard 20 in the left-right direction on a front side of the keyboard 20.

Figure 7:
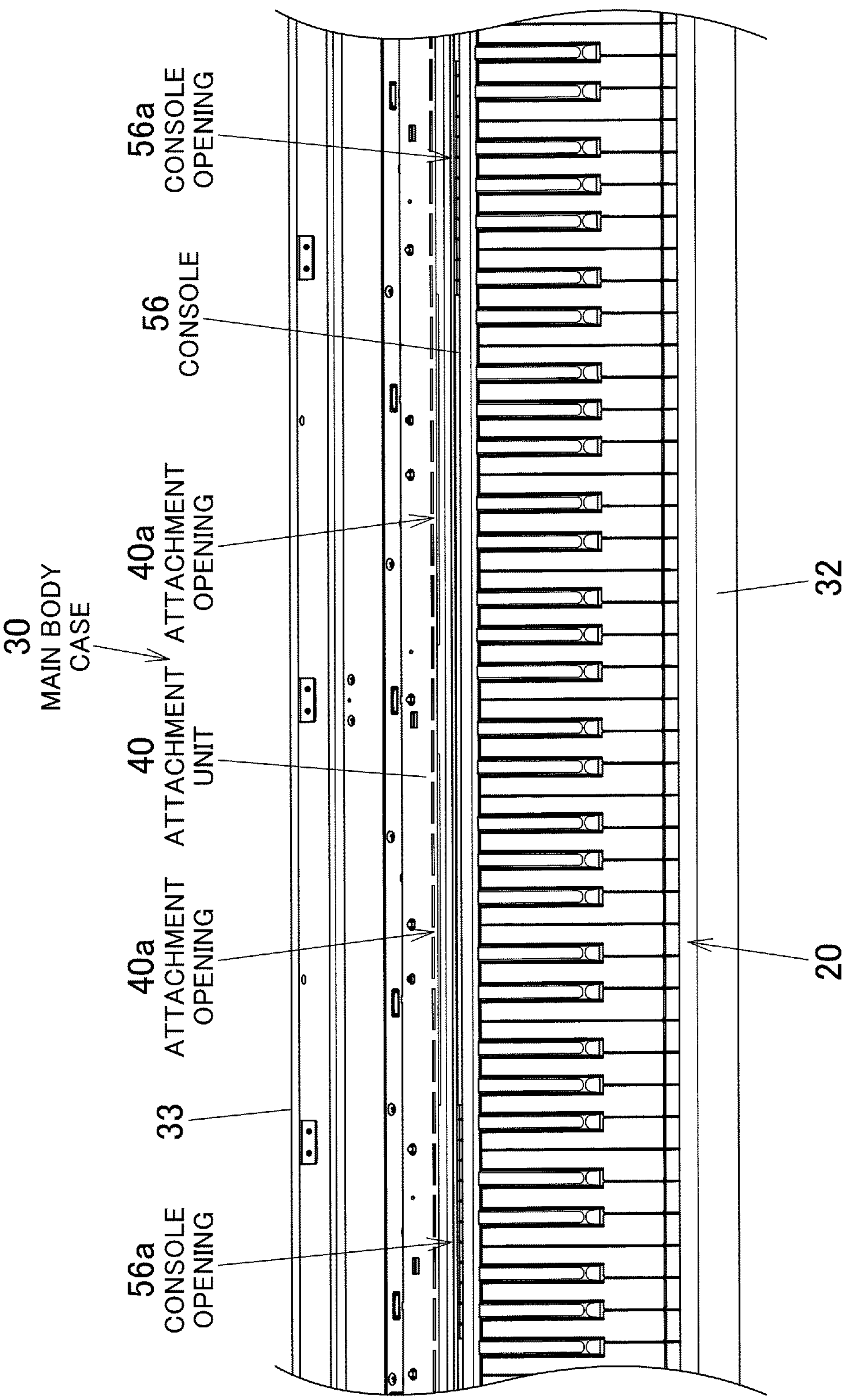
FIG. 7 is a perspective view of a part of the main body case of the electronic keyboard instrument according to the embodiment as viewed from an upper side, which shows a positional relationship between an attachment opening portion and the console opening portion.

As shown in FIG. 7, in relation to a positional relationship between the attachment openings 40*a* of the attachment unit 40 and the console openings 56*a* of the console 56, the attachment openings 40*a* are disposed more centrally and upwardly of the main body case 30 than the console openings 56*a*. As a result of the attachment openings 40*a* and the console openings 56*a* being laid out in this positional relationship, sounds from the loudspeakers 80 are designed to be emitted towards the positions of the ears of the player M in a better manner.

Figure 8:
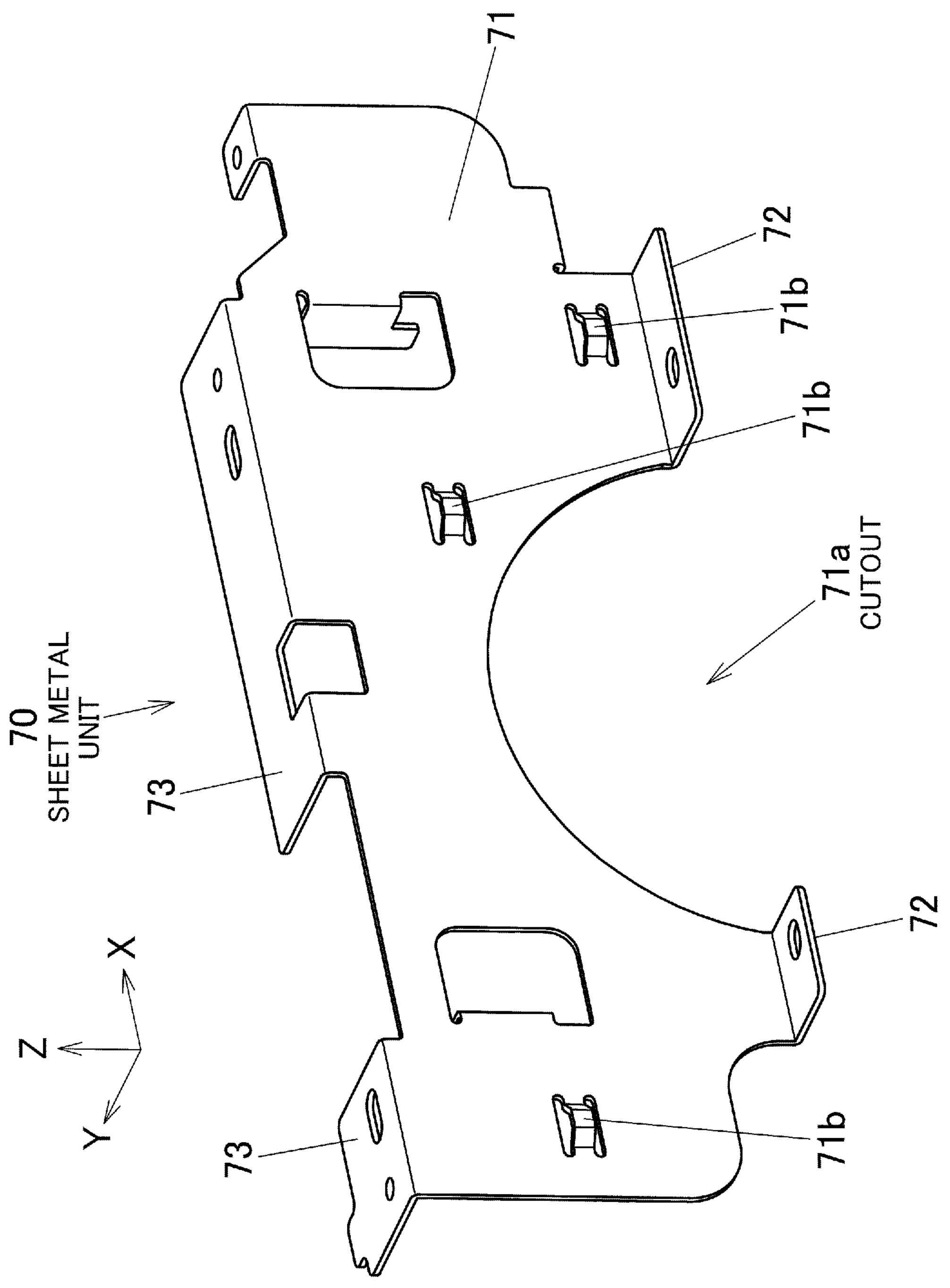
FIG. 8 is a perspective view of a sheet metal unit.

Subsequently, a configuration of the metal sheet unit 70 will be described in detail. As shown in FIG. 8, the sheet metal unit 70 includes a plate-shaped rising portion 71 which rises upwards in such a posture that both sheet surfaces thereof are oriented in the front-back direction, lower fixing portions 72 which extend from a lower end portion of the rising portion 71 horizontally backwards substantially into a plate shape, and upper fixing portions 73 which extend from an upper end portion of the rising portion 71 horizontally forwards substantially into a plate shape. The sheet metal unit 70 is provided on an upper side of each sound emitting port 82*a*. Here, other sheet metal units (not shown) having different shapes are also provided between the sheet metal units 70 which are provided individually on the upper sides of the sound emitting ports 82*a* in the interior of the main body case 30. Each sheet metal unit 70 is provided in such a manner as to lie closer to the back end wall 60*d* of the inner case 60 which supports the keyboard 20 (refer to FIG. 4), whereby the keyboard 20 is restricted from moving in the front-back direction.

A cutout 71*a*, which is opened downwards, is provided substantially at a central portion of the rising portion 71 in the left-right direction on a lower side of the rising portion 71. This cutout 71*a* is provided substantially into a semi-circular shape, and a shape and a size of the cutout 71*a* are configured to be substantially the same or identical to a shape and a size of the second sound emitting hole 37*a*2. In addition, multiple wiring attachment portions 71*b* where to attach a wiring laid out to the control circuit board 65 or the like are provided on a back surface side of the rising portion 71. The lower fixing portions 72 are fixed to the lower surface plate 37 by being screwed down to the lower surface plate 37 with screw. The upper fixing portions 73 are disposed on upper sides of back end portions of the keys 22 of the keyboard 20. The console 56 is attached on to the upper fixing portions 73 by being screwed down on to the upper fixing portions 73 with screws (refer to FIG. 4). Here, the console 56 is attached to the sheet metal units 70 and the other sheet metal units in such a manner that the console openings 56*a* are not closed.

The cutout 71*a* provided in the sheet metal unit 70 may be referred to as a part of the first communication path P1. That is, as shown in FIG. 5, the first communication path P1 constitutes a path which extends from the second sound emitting hole 37*a*2 as an originating point to the front side of the metal sheet unit 70 by passing through the cutout 71*a* from the back side of the sheet metal unit 70, then extends upwards, and eventually reaches the console opening 56*a*. In this way, the first communication path P1 includes no wall surface or the like which interrupts a passage of sound anywhere along the length thereof and constitutes a through continuous path which communicates from the second sound emitting hole 37*a*2 to the console opening 56*a* with no interruption, resulting in a path through which sound can be propagated effectively. The sound transmitted to the console opening 56*a* then passes through the console opening 56*a* and is then emitted to the upper side (towards the player M) of the keyboard 20 (the electronic keyboard instrument 1).

Figure 9:
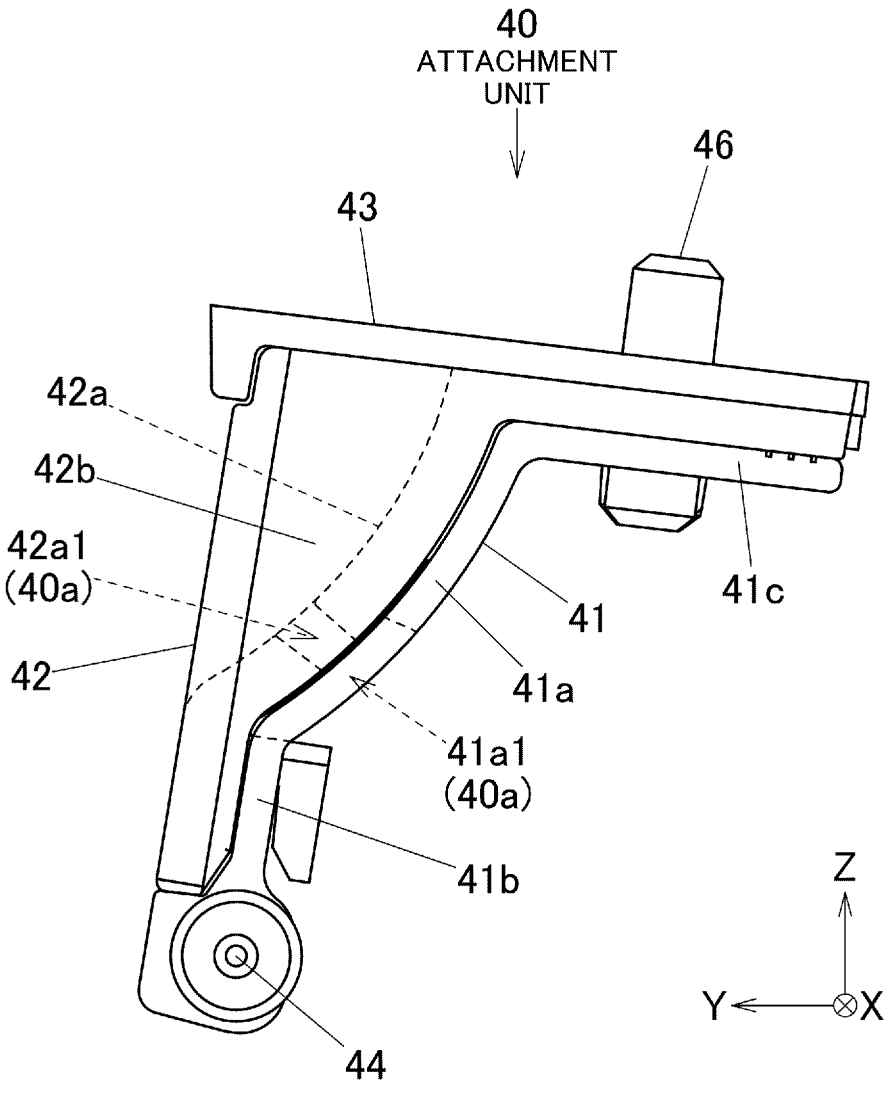
FIG. 9 is a perspective view of an attachment unit.

Subsequently, a configuration of the attachment unit 40 will be described in detail. As shown in FIG. 9, the attachment unit 40 is made up of three units such as a first metallic unit 41, a second resin unit 42 that overlaps with a front side of the first unit 41, and a third resin unit 43 that overlaps with an upper side of the second unit 42. The first unit 41 has a first arc-shaped portion 41*a* having a protruding arc shape on a back side thereof, a lower protruding portion 41*b* which protrudes downwards from a lower end portion of the first arc-shaped portion 41*a*, and a back protruding portion 41*c* which protrudes backwards from an upper end portion of the first arc-shaped portion 41*a*. A first through hole 41*a*1 is provided in the first arc-shaped portion 41*a* in such a manner as to penetrate the first arc-shaped portion 41*a* while sloping obliquely upwards therein. A rotational shaft 44 is provided at a lower end portion of the lower protruding portion 41*b*, and this rotational shaft 44 is connected rotatably with the front lid link unit FL.

The second unit 42 is provided along the shape of the first unit 41 and has a second arc-shaped portion 42*a* which includes an arc-shaped portion, as with the first arc-shaped portion 41*a*, and side plate portions 42*b*, each having a side plate shape, which are provided individually at both left and right end portions of the second arc-shaped portion 42*a*. A second through hole 42*a*1 is provided in the second arc-shaped portion 42*a* in such a manner as to penetrate the second arc-shaped portion 42*a* while sloping obliquely upwards therein. The second through hole 42*a*1 is provided in such a manner as to communicate with the first through hole 41*a*1. The first through hole 41*a*1 and the second through hole 42*a*1 are both formed into a laterally elongated shape and constitute the attachment opening 40*a*. That is, the first through hole 41*a*1 and the second through hole 42*a*1 are each provided two in such a manner as to be aligned in the left-right direction. The back space BS and the exterior space of the main body case 30 are made to communicate with each other by the attachment opening 40*a*.

The third unit 43 is formed as a plate-shaped unit and is provided with both plate surfaces thereof oriented in the upper-lower direction. The attachment unit 40 includes the back protruding portion 41*c* of the first unit 41, an upper portion of the second arc-shaped portion 42*a* of the second unit 42, and an attachment machine screw 46 which penetrates the third unit 43. The attachment machine screw 46 is attached in such a manner that an upper portion thereof is screwed to a front portion of the front lid plate 38*a*. As a result of the attachment unit 40 being made up of the three units such as the first unit 41, the second unit 42, and the third unit 43, the attachment unit 40 enables the lid 38 to be fixed to the main body case 30 with the attachment openings 40*a* provided therein.

Returning to the configuration of the back communication path BP, as shown in FIG. 5, the second communication path P2 constitutes a path which extends from the second sound emitting hole 37*a*2 as an originating point, then passes through the back space BS from the back side of the sheet metal unit 70, then extends upwards, and eventually reaches the attachment opening 40*a* (the first penetration hole 41*a*1 and the second penetration hole 42*a*1). In this way, as with the first communication path P1, the second communication path P2 also includes no wall surface or the like which interrupts a passage of sound anywhere along the length thereof and constitutes a through continuous path which communicates from the second sound emitting hole 37*a*2 to the attachment opening 40*a* with no interruption, resulting in a path through which sound can be propagated effectively. The sound transmitted to the attachment opening 40*a* then passes through the attachment opening 40*a* and is then emitted to the upper side (towards the player M) of the keyboard 20 (the electronic keyboard instrument 1).

Thus, as has been described heretofore, with the electronic keyboard instrument 1, there are secured the three sound emitting paths (the first communication path P1, the second communication path P2, the front communication path FP) for emitting sound emitted from each loudspeaker 80 towards the player M by way of the interior of the main body case 30. Among sounds emitted through the three sound emitting paths, the sounds emitted by way of the first communication path P1 and the second communication path P2 are designed to be sound louder to the player M as compared to the sound emitted by way of the front communication path FP. With the electronic keyboard instrument 1 of the present embodiment, since the first communication path P1 and the second communication path P2 are made to constitute the paths through which sound is propagated effectively, a good sound image can be obtained.

In particular, among sounds emitted from the second sound emitting hole 37*a*2, a sound corresponding to an interspace defined between the sheet metal unit 70 and the back end wall 60*d* of the inner case 60 can be emitted through the second communication path P2 by way of the cutout 71*a*, and a sound corresponding to an interspace defined between the sheet metal unit 70 and the lid 38 which is being accommodated can be emitted through the first communication path P1 by way of the cutout 71*a*. In particular, the sound emitted from the second sound emitting hole 37*a*2 and corresponding to the interspace defined between the metal sheet unit 70 and the lid 38 which is being accommodated is emitted through the first communication path P1 by way of the cutout 71*a*, thereby making it possible to enhance the sound emitted from the console opening 56*a*.

Hereinafter, the present disclosure will be described while being compared to the related art disclosed by Japanese Unexamined Patent Application Publication No. 1-321479 described above. In recent years, electronic keyboard instruments are known in which a loudspeaker is provided on a lower side of a casing such as a frame or the like. With the electronic keyboard instrument disclosed by Japanese Unexamined Patent Application Publication No. 1-321479 described above, however, in the case that a loudspeaker is provided on a lower side of a casing, a sheet metal unit for supporting the keyboard or the like is situated above a sound emitting port of the loudspeaker, and hence, it is difficult to secure sufficiently a sound emitting path which is laid out from the loudspeaker to the upper side of the keyboard within the casing. As a result, there is a risk of obtaining no good sound image.

In contrast with this, with the electronic keyboard instrument 1 according to the present embodiment, the electronic keyboard instrument 1 includes the main body case 30, the keyboard 20 provided inside the main body case 30, the loudspeaker 80 disposed on the lower side of the main body case 30 in such a manner that the sound emitting port 82*a* is directed towards the keyboard 20, and the sheet metal unit 70 provided on the upper side of the loud speaker 80 and configured to fix the keyboard 20 to the main body case 30. Then, the main body case 30 includes the sound emitting hole 37*a* in the portion corresponding to the sound emitting port 82*a*, and the sheet metal unit 70 includes the cutout 71*a* in the portion corresponding to the sound emitting hole 37*a*. Finally, there is provided inside the main body case 30 the first communication path P1 through which the sound emitted by the loudspeaker 80 is emitted from the upper side of the keyboard 20 towards the outside by way of the cutout 71*a* provided in the sheet metal unit 70.

With the electronic keyboard instrument 1 configured as described above according to the present embodiment, the sound emitted from the loudspeaker 80 passes through the sound emitting hole 37*a*, without being interrupted by the wall surface or the like, travels through the first communication path P1 which extends through the cutout 71*a* of the sheet metal unit 70, and is eventually transmitted towards the upper side of the keyboard 20, that is, towards the player M. As a result, the sound emitting path can be secured from the loudspeaker 80 towards the player M while realizing the configuration in which the keyboard 20 is supported effectively on the main body case 30 by the sheet metal unit 70, thereby making it possible to secure the sound passage structure with good efficiency. As a result, even in the case that the loudspeaker 80 is provided on the lower side of the case 30 as in the case with the electronic keyboard instrument 1 of the present embodiment, a good sound image can be obtained.

With the electronic keyboard instrument 1 according to the present embodiment, the sound emitting hole 37*a* includes the first sound emitting hole 37*a*1 provided on a front side in the front-back direction of the keyboard 20 and the second sound emitting hole 37*a*2 provided on the back side in the front-back direction. Then, the sheet metal unit 70 is disposed between the first sound emitting hole 37*a*1 and the second sound emitting hole 37*a*2 in the front-back direction. In addition, the cutout 71*a* has an outer circumferential shape corresponding to an outer circumferential shape of the second sound emitting hole 37*a*2. As a result, a specific configuration for providing the first communication path P1 on the back side of the main body case 30 can be realized. In addition, the sound passing through the second sound emitting hole 37*a*2 can be made to pass through the cutout 71*a* effectively by giving the cutout 71*a* the outer circumferential shape which corresponds to the outer circumferential shape of the second sound emitting hole 37*a*2.

With the electronic keyboard instrument 1 according to the present embodiment, the outer circumferential shape of the second sound emitting hole 37*a*2 and the outer circumferential shape of the cutout 71*a* are formed substantially into the semi-circular shape. As a result of the cutout 71*a* being formed substantially into the semi-circular shape in the way described above, the size of the cutout 71*a* can be enhanced while securing the strength of the sheet metal unit 70.

With the electronic keyboard instrument 1 according to the present embodiment, the size of the second sound emitting hole 37*a*2 and the size of the cutout 71*a* are made substantially the same or identical to each other. As a result, the acoustic effect of the sound passing through the second sound emitting hole 37*a*2 to travel out of the cutout 71*a* can be enhanced.

With the electronic keyboard instrument 1 according to the present embodiment, the electronic keyboard instrument 1 includes the console 56 provided along the left-right direction and configured to cover the back end portions of the keys 22 in the front-back direction, and the console opening 56*a* is provided in the console 56 in such a manner as to establish a communication between the interior and the exterior of the console 56. Then, the first communication path P1 extends from the loudspeaker 80 to the upper side of the keyboard 20 by way of the cutout 71*a* and the console opening 56*a*. As a result, the specific configuration of the first communication path P1 which is not interrupted by the wall surface or the like can be realized while providing the console 56 for covering the back end portions of the keys 22.

With the electronic keyboard instrument 1 according to the present embodiment, each console opening 56*a* is provided only in a portion located on a virtual line VL connecting the sound emitting port 82*a* in the console 56 with a player M, and its vicinity, when the electronic instrument 1 is viewed above in a plane with the player placed at a front side in the front-back direction and at a substantially central portion in the left-right direction of the keyboard 20. As a result, when compared to a configuration in which the console opening 56*a* is provided over substantially the whole area of the console 56, the sound from each loudspeaker 80 can be emitted effectively from each console opening 56*a* towards the player M while securing the strength, blindfolding function, and design of the console 56.

With the electronic keyboard instrument 1 according to the present embodiment, the electronic keyboard instrument 1 includes the lid 38 which is configured to be accommodated in the back space BS defined on the back side of the sheet metal unit 70 inside the main body case 30. Then, the lid 38 includes the attachment unit 40 in which the attachment openings 40*a* are provided in the handle portions thereof, and the attachment openings 40*a* so provided are each configured to establish the communication between the back space BS and the outside of the main body case 30. Then, the second communication path P2 is provided inside the main body case 30 with the lid 38 accommodated in the back space BS, and this second communication path P2 extends from the loudspeaker 80 and reaches the attachment opening 40*a* by way of the back space BS. According to this configuration, not only is sound transmitted towards the player M by way of the first communication path P1, but also sound is further transmitted from the loudspeaker 80 towards the player M by way of the second communication path P2 in the back side portion of the electronic keyboard instrument 1, thereby making it possible to realize the electronic keyboard instrument 1 in which the sound from the loudspeaker 80 is effectively transmitted towards the player M.

With the electronic keyboard instrument 1 according to the present embodiment, the attachment opening 40*a* (the first through hole 41*a*1 and the second through hole 42*a*1) is made into the hole which slopes obliquely upwards from the back space (BS) towards the outside of the main body case 30. As a result, in the attachment unit 40, the attachment opening 40*a* can be directed towards the player M, thereby making it possible to transmit the sound emitted from the attachment opening 40*a* towards the player M effectively.

With the electronic keyboard instrument 1 according to the present embodiment, the loudspeaker 80 is provided on both the leftward portion and the rightward portion in the left-right direction on the lower side of the main body case 30. Then, the attachment opening 40*a* is provided in both the leftward portion and the rightward portion of the attachment unit 40 in the left-right direction. As a result, the form is realized in which each attachment opening 40*a* is provided on the virtual line which connects each loudspeaker 80 with the player M. As a result, when compared to a configuration in which the attachment opening 40*a* is provided over substantially the whole area of the attachment unit 40, the sound from each loudspeaker 80 can be emitted effectively from each attachment opening 40*a* towards the player M while securing the strength and design of the attachment unit 40.

Here, the embodiment of the present invention that has been described heretofore is presented as the example, and hence, there is no intention to limit the scope of the present invention by the embodiment. The novel embodiment can be carried out in other various forms, and various omissions, replacements, and modifications can be made thereto without departing from the spirit and scope of the present invention. Those resulting embodiments and modified examples thereof are included in the scope and gist of the present invention and are also included in the scope of inventions claimed for patent under claims below and their equivalents.

What is claimed is:

1. An electronic keyboard instrument comprising:

a main body case configured to include a sound emitting hole in a lower side;

a keyboard provided inside the main body case;

a sound emitting unit disposed on the lower side of the main body case in such a manner that a sound emitting port corresponding to the sound emitting hole is directed towards the keyboard; and a plate-shaped unit provided on an upper side of the sound emitting unit and configured to include a cutout formed in a portion corresponding to the sound emitting hole, wherein a communication path is provided inside the main body case, the communication path being configured to enable a sound emitted by the sound emitting unit to be emitted from an upper side of the keyboard towards an outside by way of the cutout in the plate-shaped unit.

2. The electronic keyboard instrument according to claim 1, wherein the sound emitting hole comprises a first sound emitting hole provided on a front side of a key of the keyboard in a longitudinal direction thereof and a second sound emitting hole provided on a back side in the longitudinal direction.

3. The electronic keyboard instrument according to claim 2, wherein the plate-shaped unit is disposed on a side of the second sound emitting hole between the first sound emitting hole and the second sound emitting hole in the longitudinal direction.

4. The electronic keyboard instrument according to claim 2, wherein an outer circumferential shape of the second sound emitting hole and an outer circumferential shape of the cutout are formed substantially into a semi-circular shape.

5. The electronic keyboard instrument according to claim 2,

Wherein a size of the second sound emitting hole and a size of the cutout are made substantially identical to each other.

6. The electronic keyboard instrument according to claim 1, comprising:

a cover unit provided along an alignment direction of the key and configured to cover a back end portion of the key in the longitudinal direction, wherein a first communication hole is provided in the cover unit in such a manner as to establish a communication between an interior and an exterior of the cover unit, and wherein the communication path comprises a first communication path which extends from the sound emitting unit, passes a front side of the plate-shaped unit in the longitudinal direction by way of the cutout, and reaches the first communication hole.

7. The electronic keyboard instrument according to claim 6, wherein the first communication hole is provided only in a portion and its vicinity located on a virtual line connecting the sound emitting port in the cover unit with a player, when the electronic instrument is viewed above in a plane with the player placed at a front side of the longitudinal direction and at a substantially central portion in the alignment direction of the keyboard.

8. The electronic keyboard instrument according to claim 1, comprising:

a keyboard lid; and an attachment unit comprising a second communication hole configured to establish a communication between a space on a back side of the plate-shaped unit in the longitudinal direction thereof and an outside of the main body case, wherein the communication path comprises a second communication path provided inside the main body case with the keyboard lid being accommodated, the second communication path extending from the sound emitting unit and reaching the second communication hole by way of the space.

9. The electronic keyboard instrument according to claim 8, wherein the second communication hole is made into a hole which slopes obliquely upwards from the space towards an outside of the main body case.

10. The electronic keyboard instrument according to claim 8, wherein the sound emitting unit is provided on both a leftward portion and a rightward portion in the alignment direction of the keyboard on a lower side of the main body case, and wherein the second communication hole is provided in both a leftward portion and a rightward portion on the attachment unit in the alignment direction.

11. The electronic keyboard instrument according to claim 1, wherein the keyboard is fixed to the main body case by the plate-shaped unit.

12. The electronic keyboard instrument according to claim 1, wherein the communication path is positioned in a location that does not overlap with the keyboard in an upper-lower direction.

13. The electronic keyboard instrument according to claim 1, wherein a front communication path is provided inside the main body case, the front communication path being configured to enable a sound emitted by the sound emitting unit to pass through the sound emitting hole and reach a gap defined between multiple keys by way of a space defined inside the main body case.

14. The electronic keyboard instrument according to claim 8, wherein the attachment unit comprises a first unit, a second unit that overlaps with a front side of the first unit, and a third unit that overlaps with an upper side of the second unit, wherein the first unit comprises a first arc-shaped portion having an arc shape on a back side thereof, and wherein a first through hole is provided in the first arc-shaped portion in such a manner as to penetrate the first arc-shaped portion.

15. The electronic keyboard instrument according to claim 14, wherein the second unit comprises a second arc-shaped portion including a portion of an arc shape and side plate portions provided into a side plate shape individually at both left and right end portions of the second arc-shaped portion, wherein a second through hole is provided in the second arc-shaped portion in such a manner as to penetrate the second arc-shaped portion, and wherein the second through hole is provided in such a manner as to communicate with the first through hole.

* * * * *